United States Patent Office 3,238,051
Patented Mar. 1, 1966

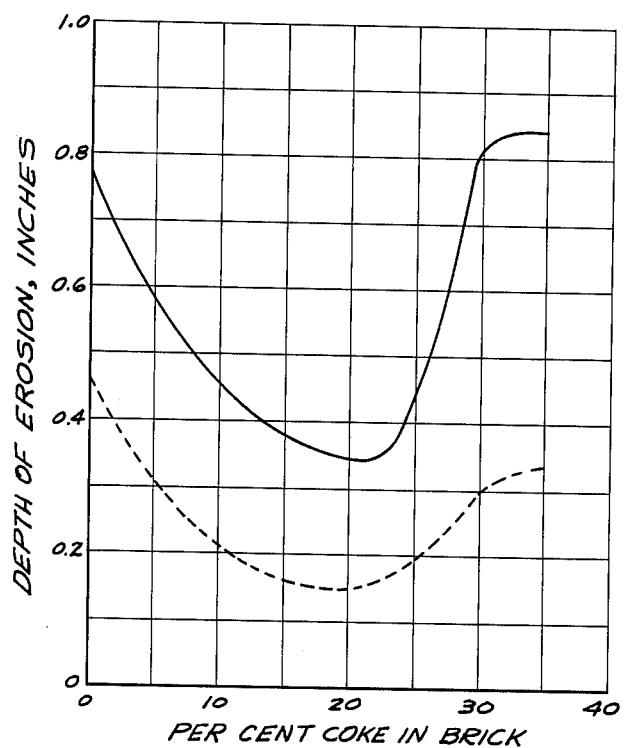

3,238,051
REFRACTORY WITH IMPROVED RESISTANCE TO CERTAIN SLAG
Ernest P. Weaver and Ben Davies, Pittsburgh, Pa., assignors to Harbison-Walker Refractories Company, Pittsburgh, Pa., a corporation of Pennsylvania
Filed Jan. 20, 1964, Ser. No. 338,834
4 Claims. (Cl. 106—56)

This invention relates to basic refractories of high purity and controlled content of accessory metal oxides, which exhibit significantly improved physical and chemical resistance to certain slag attack as compared with previously available brick.

Although not limited to such use, the refractories provided by this invention are especially adapted for use in connection with the production of steel by the modern oxygen blowing process, sometimes referred to as the LD process and, among other terms, merely as oxygen steelmaking. In that process, briefly, the steelmaking reactions are greatly accelerated by the introduction of gaseous oxygen, generally above the molten metal batch in a vessel or converter. A basic slag is used in the process, which necessitates the use of chemically basic refractories. The consequence of oxygen blowing and the relatively low basicity of early oxygen converter slag in the initial portion of a blow, is that the refractory lining adjacent the normally expected slag splash zone is subjected to unusually severe conditions. One of the results of the introduction of oxygen steelmaking process has been continuous experimentation on the part of refractory technologists looking toward the development of better refractories.

Typically, the lining of an oxygen converter consists of an 18″ layer of basic brick beginning at the hot face backed by 4 to 6″ of basic rammed refractory lining, and between the rammed lining and the outer metal shell about 4½″ layer of burned basic brick. The basic refractories commonly used are those consisting principally of dead burned magnesite (we use this terminology synonymous with the word magnesia or periclase, the latter being terminology indicative of well-developed crystalline dead burned magnesite), or dead burned dolomite (CaO·MgO on about a 1:1 molar basis). Sometimes up to about 10 parts, by weight, of hard burned lime (calcia) is mixed with either of the foregoing materials. Theoretically, lime (CaO), alone, is desirable, because of its very high melting point; but extensive usage has been precluded by its pronounced tendency to hydrate upon exposure to the atmosphere. Of course, dolomite also tends to hydrate, but it is nowhere near as susceptible as lime.

A highly successful and novel, zoned working lining for an oxygen converter is disclosed and claimed in copending application, Serial No. 132,788, by H. Carl Willenbrock, Jr., entitled "Oxygen Converter Linings" (now United States Patent No. 3,148,238). The zoned working lining therein disclosed and claimed, in essence, is comprised of three sections; namely, one about the cone section, which is of ceramically bonded, high purity, magnesite brick, one of tar bonded basic refractory which extends over the bottom and up a limited portion of the barrel of the furnace, but terminating at a level below the expected slag splash area when the vessel is in operation, and the remaining area is one fabricated of a novel, tar bonded refractory composition which has been very successful in achieving extended lining life, even in the presence of the highly corrosive and destructive slag which one encounters in the oxygen steelmaking process. This latter refractory was disclosed and claimed in application, Serial No. 34,438, King et al., entitled "High Temperature Refractory," which application has been abandoned in favor of a copending continuation-in-part application, Serial No. 266,796, of the same title and having the same inventors (now United States Patent No. 3,141,784). In large part, the refractories of this latter patent application have been able to provide extended lining life because of a unique ability to preferentially control chemical reaction between the refractory and oxygen steelmaking slags, whereby refractory destruction is greatly reduced or at least drastically slowed.

In general, it may be stated that prior workers have sought to reduce refractory destruction in the presence of oxygen steelmaking process slags by (1) causing preferential and controlled chemical reaction between refractory and slags, whereby refractory destruction is reduced or at least slowed down, (2) attempting to prevent contact between the refractory and slags, or (3) a combination of the foregoing. The latter is considered the most prevalent practice of prior workers. A good example of this latter approach is disclosed in the copending application, Serial No. 266,796, above identified. For an example of the third system or approach, we would also suggest reference to this same application, in which the refractory therein disclosed and claimed is impregnated or bonded with nonaqueous, cokable, carbonaceous materials. An example of the second procedure is the mere tar impregnation or bonding of any commercially available, chemically basic, refractory composition selected from the group dead burned dolomite, dead burned magnesite and hard burned lime.

Some prior workers have suggested the addition of dead burning or sintering materials, such as iron oxide, alumina, mill scale, etc., to the basic refractory compositions just mentioned, to reduce their susceptibility to hydration to thereby provide longer shelf life; but it is our experience that when more than about 2% of any one of these types of materials is added to the selected basic refractory, the refractoriness thereof (resistance to high temperatures, broadly) is sacrificed.

Some background discussion of the means by which slag destroys refractories is thought useful to a better understanding of the foregoing and of the present invention, and the departure which this invention is considered to represent over prior practices. Generally, it can be stated that slag destroys refractory by (1) erosion (a mechanical or physical washing away of refractory particles), (2) chemical reaction (formation of new and less refractory phases by reaction between slag and refractory components), and (3) corrosion (a combination of chemical reaction with, and physical washing or carrying away of, refractory particles).

Relative slag penetration of a refractory in service (or in simulated service conditions) is considered by many a physical manifestation of degree of resistance of a given refractory material, to both mechanical or physical and chemical destruction of the refractory by the slag. For a given service environment, a perfectly nonwettable, impermeable, thermal shock resistant, insert refractory would represent the optimum; but, as a practical matter, we know of no such perfect refractory material or device for use in contact with the highly destructive slag necessary to the successful practice of the basic oxygen steelmaking process.

Another property to be considered when one selects a refractory to be used in the normally expected slag splash zone of an oxygen converter vessel or furnace is, of course, strength. Particularly with the advent of newer and larger vessels, and especially in the lower rings or courses of their refractory lining, brick are subjected to pressures on the order of 40 to 50 p.s.i., primarily due to the weight of superimposed courses or rings of refractory.

It is known that burned basic brick (which is generically descriptive of those which have been fired to elevated temperatures and which include a preponderant amount of material selected from the group dead burned magnesia, dead burned dolomite and hard burned lime) frequently possess much greater strength than unburned brick, due to the ceramic bond which is formed during the firing or burning process. Thus, particularly with the above noted contemporary advent of extremely large oxygen furnaces, it is desirable that the basic brick selected be characterized by some ceramic bond, as contrasted to the more commonly available tar bonded or unburned variety. However, as one seeks to obtain greater strength by hard firing, and an increase in density and decrease in porosity, etc., a ceramic structure of increased rigidity results. The inherent rigidity of many of these very dense burned brick has severely decreased their thermal shock or thermal spalling resistance. (We consider "Thermal Spalling Resistance" to be generically descriptive of relative resistance to cubing, checking, spalling and other physical manifestations of breakdown when subjected to various types of cyclic temperature variation.) We thus theorized that a brick or shape which could combine the desired strength one obtains from ceramic bonding, without extensive loss of thermal spalling resistance and which would further show increased resistance to penetration by oxygen steelmaking slag, would be particularly advantageous for fabrication of at least that portion of the working lining about the normally expected area of slag contact.

It is accordingly an object of this invention to provide a predominantly chemically basic, ceramically bonded, refractory shape of improved properties. It is a further object of the invention to provide an improved, predominantly chemically basic, ceramically bonded, refractory shape of improved resistance to destruction by basic oxygen steelmaking slag.

Briefly, according to a preferred embodiment of this invention, there is provided a ceramically bonded, chemically basic refractory oxide brick analyzing at least about 95% MgO+CaO, by weight, on a calcined basis. The brick is saturated throughout with finely divided particulate coke material in a quantity equal to between 10 and 25% of the total weight of the refractory oxide and coke. The brick is further impregnated throughout with a nonaqueous, cokable, carbonaceous material selected from the group consisting of tar and pitch. The tar and pitch amount to between 4 and 10%, by weight, based on the total weight of refractory and coke. Brick of optimum composition show a better than 50% increase in resistance to erosion and penetration by oxygen converter slag. The attached drawing is a comparative plot indicative of relative resistance of specimens studied.

The following are typical analyses of the early and late slags of the oxygen steelmaking process, and are thought to be of assistance to a better understanding of the invention.

| | Early Slag, percent | Late Slag, percent |
|---|---|---|
| Silica ($SiO_2$) | 32.1 | 18.1 |
| Lime (CaO) | 40.9 | 36.0 |
| Iron Oxide ($Fe_2O_3$) | 11.5 | 30.5 |
| Manganese Oxide (MnO) | 6.9 | 6.7 |
| Magnesia (MgO) | 5.7 | 5.7 |
| Titania ($TiO_2$) | 1.4 | 1.4 |
| Phosphorous Pentoxide ($P_2O_5$) | 1.5 | 1.5 |

Examination of numerous brick from service in basic oxygen furnaces has shown that the fines (nominally the —65 mesh material which makes up the groundmass or matrix) are preferentially attacked by slag. This has been minimized by use of high purity, chemically basic, refractory systems, careful balance of trace impurities and certain oxides which constitute less than about 5% of the total weight of the brick, and by various combinations of tar, pitches and other nonaqueous, cokable carbonaceous materials. We determine to provide a new matrix and groundmass which would further improve the slag resistance.

A series of five brick mixes was made using a high purity, dead burned magnesite grain of carefully balanced CaO and $SiO_2$ content and 0 to 35% of ball milled metallurgical grade coke. The coke was gradually substituted for ball milled magnesite (to maintain a size graded particle mixture capable of being formed on a brick press), and the magnesite-coke mixes were tar bonded and pressed at 8,000 p.s.i. on a brick press. The tar bonded mixtures were pressed at a temperature between about 250 and 270° F. The brick were submerged in a mass of granular metallurgical coke in a mortared refractory box. The refractory box was fabricated of ceramically bonded periclase brick. The box was built within a kiln. The kiln was heated to a temperature of 2,000° F. at a rate of about 50° F. per hour with the 2000° F. temperature being held for about 15 hours.

After the kiln and contained box and brick were cooled, the brick were recovered. Physically, all of the brick were free of macro cracks. Density decreased as the percentage of ball mill fine metallurgical coke increased. Surprisingly, there was small variation in porosity. The coke additions appeared to adversely effect strength. However, the strengths were considered adequate. Further, by subsequent thorough impregnation of the shapes with liquified, nonaqueous, cokable, carbonaceous material, they recovered most of the lost strength. The most spectacular effect of the metallurgical coke addition was the sharp reduction in erosion by oxygen steelmaking slags at 2900° F. in a slag test. The tests, however, indicated careful control must be had of the coke addition. When the coke constituted more than about 25% of the shape, erosion increased at a precipitous rate. 20%, by weight, of coke provided the best brick. As 0% coke was approached, there was a less sharp increase in penetration and erosion, but it also increased at a rapid rate. We consider about 10% coke as a minimum. The following table lists, in tabular form, the mixes prepared, and various of the physical properties measured in our test work.

| Mix | A | B | C | D | E |
|---|---|---|---|---|---|
| Magnesite: | | | | | |
| −4 +10 mesh_____percent__ | 30 | 30 | 30 | 30 | 30 |
| −10+28 mesh_____do____ | 35 | 35 | 35 | 35 | 35 |
| Ball Milled Fines_____do____ | 35 | 25 | 15 | 5 | 0 |
| Ball Milled Metallurgical Coke do____ | | 10 | 20 | 30 | 35 |
| Liquid Pitch_____ | 6 | 7 | 8 | 9 | 9.5 |
| Burn_____ | In refractory box submerged in coke. Temperature 2,000° F., 15 hr. hold | | | | |
| Bulk Density, p.c.f. (Av. 8): | | | | | |
| Before burn_____ | 187 | 173 | 161 | 149 | 147 |
| After burn_____ | 183 | 169 | 156 | 145 | 139 |
| Modulus of Rupture, p.s.i._____ | 920 | 450 | 500 | 450 | 490 |
| Apparent Porosity_____percent__ | 17.9 | 17.3 | 17.8 | 18.6 | 19.2 |
| Slag test at 2,900° F.: | | | | | |
| 600 gms. each early and late slag, Erosion depth, inches— | | | | | |
| 1. Base of hole_____ | 0.77 | 0.46 | 0.35 | 0.82 | 0.84 |
| 2. One inch from end of brick__ | 0.46 | 0.21 | 0.15 | 0.30 | 0.34 |

The magnesite used in the foregoing tests had a chemical analysis typically as set forth in Table II.

*Table II*

| | Percent |
|---|---|
| Magnesia (MgO) | 96.8 |
| Lime (CaO) | 1.9 |
| $R_2O_3$ ($Al_2O_3$ and $Fe_2O_3$) | 0.5 |
| Silica ($SiO_2$) | 0.65 |
| Loss on ignition | 0.15 |

The overall size grading of material added to all of the mixes was typically as follows:

Table III

| | Percent |
|---|---|
| —4 on 10 mesh | 35 to 40 |
| —10 on 28 mesh | 15 |
| —28 +65 mesh (range of total —10 on 65 is about 30 to 35%) | 15 |
| —65 mesh to ball mill fines from 50 to 60% of the —65 mesh fraction rested on a 150 mesh screen | 30 |

Some variation between Table III and I is immediately evident, i.e., for example, we add about 40% —4 on 10 mesh magnesite and end up with 30% reported in the mix. This is because of breakdown of particles in mixing and forming. Note the entire —28 on 65 mesh fraction is the result of breakdown.

The magnesite of Table II is the preferred basic refractory composition for the practice of this invention. While the analysis of Table II is a typical one, the MgO content can range from about 96 to about 97%, but the CaO and $SiO_2$ contents are always present in a weight ratio between 3 to 1 and about 4 to 1. The $R_2O_3$ materials ($Al_2O_3$ and $Fe_2O_3$, sometimes perhaps $Cr_2O_3$) do not exceed 1%. The lower limit of 96% MgO limit is somewhat more flexible than the upper one, and may be as low as on the order of about 95.5%.

It should be understood that other commercially available, dead burned magnesites can be used. However, we prefer that the total MgO+CaO content be at least about 95%. Dead burned refractory grain of the type disclosed and claimed in United States Patents No. 3,060,000, Snyder et al. and No. 3,060,042, Leatham et al., both owned by a common assignee, are very satisfactory.

There is a slag test referred to in Table I. For the test, test specimens are placed in a kiln which is heated to about 2900° F. They have a surface inclined at an angle to the horizontal and molten slag is allowed to drip on them in such a manner as to move or flow downwardly over at least a major portion of the length of the inclined surface. In Table I, we refer to "base of hole" and "1 inch from end of brick." To arrive at these measurements, the test specimens, after being subjected to the slag test, are removed and sawed in half substantially centrally of the area of slag contact and erosion. The area of deepest erosion, which is thereby exposed, is considered the "hole." The other measurement is made 1″ from the lower edge of the inclined surface of the test specimen.

In the drawings, the dashed line is a plot of measured depth of erosion at that point 1″ from the lower edge of the inclined face of the brick, and the solid line is a plot of the depth at the base of the hole, of the series of test specimens. These plots were confirmed by testing subsequent to that reported in Table I.

Our brick may generally be characterized, from a structural standpoint, as comprised as a body made up of a skeletal network of coarse texture, which network is comprised of ceramically bonded, chemically basic refractory oxide grain, and as having a matrix or groundmass of finely divided particulate metallurgical coke particles. The foregoing is, preferably, impregnated with from about 4 to 10% of a non-aqueous, cokable, carbonaceous bonding material selected from the group consisting of tar and pitch. The terms "tar and pitch" as utilized by the refractory art is discussed, for example, in United States Patent No. 3,070,449, "Refractory Practices," of which we are the coinventors.

We have discussed burning of the brick at 2000° F. A satisfactory range is probably as low as 1800° F. to as high as 3100° F. We caution, however, that as 3100° F. is approached and passed, there is a serious possibility of reaction between the refractory oxide and the metallurgical coke. Further, when a burning temperature as low as 1800° F. is used, we do not obtain the degree of ceramic bonding we desire and, thus, lack the requisite strength for handleability and resistance to deformation or slumping under load in lower courses of an oxygen converter vessel.

Having thus described the invention in detail and with sufficient particularity as to enable those skilled in the art to practice it, what is desired to have protected by Letters Patent is set forth in the following claims:

We claim:

1. A ceramically bonded brick of refractory oxide and coke material, the refractory oxide analyzing at least about 95% CaO+MgO, by weight, on an oxide basis, the brick being characterized by a ceramically bonded network of refractory grain and groundmass of finely divided particulate coke material in a quantity equal to between about 10 and about 25% of the total weight of the refractory and coke.

2. A ceramically bonded brick of refractory oxide and coke material, the refractory oxide analyzing at least about 95% CaO+MgO, by weight, on an oxide basis, the brick being characterized by a ceramically bonded network of refractory grain and a groundmass of finely divided particulate coke material in a quantity equal to between about 10 and about 25% of the total weight of the refractory and coke, and said brick being impregnated throughout with material of the group consisting of tar and pitch, said tar and pitch amounting to between 4 and 10%, by weight, based on the total weight of the refractory and coke.

3. A ceramically bonded predominantly basic refractory oxide brick, from 10 to 25% of said brick being ball mill fine metallurgical coke, substantially the remainder of the brick being dead burned magnesite grain, said magnesite grain being about —4 +65 mesh, said magnesite forming a coarse textured skeletal network, the interconnected interstices of which are filled with said finely divided particulate coke, said brick being impregnated throughout with nonaqueous, cokable, carbonaceous material, said carbonaceous material amounting to between 4 and 10%, by weight, based on the total weight of the refractory oxide and coke.

4. The brick of claim 3 in which said refractory grain analyzes between about 96 and 97% MgO, there being CaO and $SiO_2$ in a weight ratio between about 3 to 1 and about 4 to 1, the remainder being material of the group consisting essentially of $Cr_2O_3$, $Fe_2O_3$, and $Al_2O_3$ in an amount not exceeding about 1%.

References Cited by the Examiner

UNITED STATES PATENTS 3,148,238    9/1964    Willenbrock _____ 106—58

FOREIGN PATENTS 118,590    6/1944    Australia.
1,318,069    1/1963    France.

SAMUEL H. BLECH, *Primary Examiner.*

TOBIAS E. LEVOW, *Examiner.*

J. E. POER, *Assistant Examiner.*